Dec. 1, 1970  T. R. RICHARDSON  3,543,588

ACCESSORY INSTALLATION

Filed Nov. 12, 1968

INVENTOR.
Truman R. Richardson
BY
Paul Fitzpatrick
ATTORNEY

United States Patent Office 3,543,588
Patented Dec. 1, 1970

3,543,588
ACCESSORY INSTALLATION
Truman R. Richardson, Indianapolis, Ind., assignor to General Motors Corporation, Detroit, Mich., a corporation of Delaware
Filed Nov. 12, 1968, Ser. No. 774,975
Int. Cl. F02c 7/20; F16h 37/00
U.S. Cl. 74—15.8
8 Claims

ABSTRACT OF THE DISCLOSURE

An accessory drive arrangement for a ducted fan type aircraft engine has the accessory drive housing suspended from the engine case within the by-pass duct. The accessory drive housing is slidable on the engine case and is driven by a shaft extending axially of the engine. The housing for this shaft locates the accessory drive housing axially of the engine. The axially-extending shaft and its housing may be retracted rearwardly from a transfer gear enclosure by which they are coupled to the engine so that the assembly of the accessory drive and the axial shaft may be removed vertically from the engine.

---

The invention herein described was made in the course of work under a contract or subcontract thereunder with the Department of Defense.

My invention relates to installations of accessory drive gearing on engines, and particularly to improved arrangements particularly suited for driving accessories of gas turbine engines of the by-pass or ducted fan type.

The invention is disclosed herein its preferred embodiment as a part of a by-pass jet propulsion engine. However, it will be apparent to those skilled in the art that principles and features of the invention are applicable to other purposes.

The principal objects of my invention are to provide an accessory drive installation suited to the space requirements of a by-pass jet engine, to provide accessory installations which facilitate removal of the accessory drive case accessories from the engine as a unit, to provide a drive for and mounting for an accessory drive case which allows for relative expansion of the engine and the driving means, and to provide an accessory drive installation for a ducted fan engine locating the accessory drive at a point where space is most readily available between the gas generator and the fan duct. Further objects of the invention are to provide an accessory drive installation in which the accessory case is slidably mounted on the engine and is located by a drive shaft housing. Still further objects of the invention are to provide a drive shaft and drive shaft housing which are retractable from the point of connection to the engine so as to facilitate removal of the accessory case from the engine.

The nature of my invention and the advantages thereof will be clear to those skilled in the art from the succeeding detailed description of the preferred embodiment of the invention and the accompanying drawings thereof.

Figure 1:
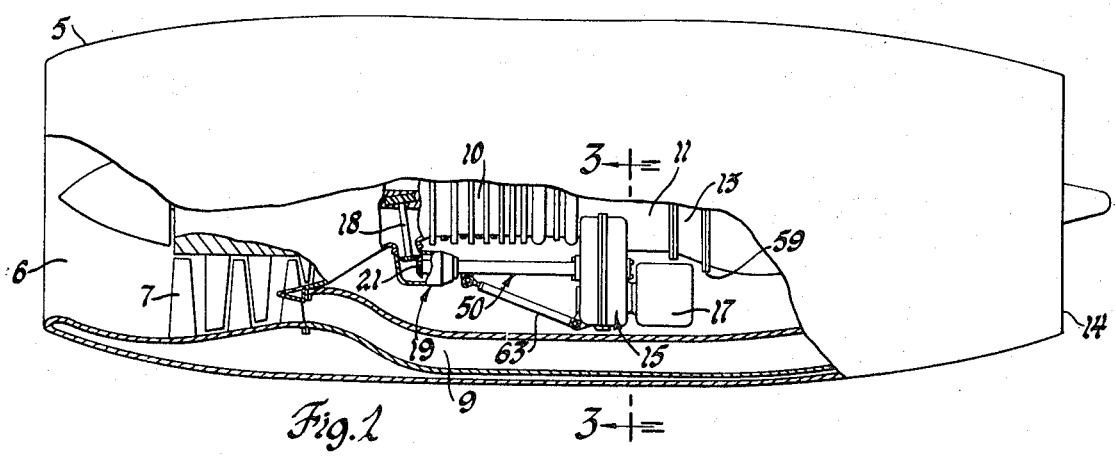
FIG. 1 is a longitudinal view of a by-pass jet propulsion engine with parts cut away and in section.

A typical ducted fan engine installation includes a nacelle or other engine housing 5 defining an air inlet 6 to a first compressor or fan 7, some of the output of which flows through an annular by-pass duct 9. The remaining air flows into a second compressor 10 which delivers air to a combustion apparatus enclosed in case 11 which supplies combustion products to a turbine or turbines 13. The turbines and the by-pass duct discharge through a propulsive nozzle 14. As with gas turbine aircraft engines in general, it is necessary to drive or mount engine accessories such as fuel pumps, fuel controls, starters, and the like, and aircraft service accessories such as hydraulic pumps, electrical supply alternators, and so on. It is common practice to mount a number of such accessory devices on an accessory drive housing which contains a gear train coupled to a turbine of the engine and includes mounting pads for the accessories and shafts which couple to the drive shafts of the accessories. Such drive housings are well known.

My invention relates to an installation particularly suited to the requirement of the by-pass engine illustrated, but which is also applicable to other installations. Proceeding now to the description of the accessory drive installation, the accessory drive housing 15 suspended below the engine mounts a number of accessory devices such as that indicated at 17. Power input to the accessory drive gearing includes an accessory drive radial shaft 18 (FIGS. 1 and 2) geared to one of the shafts of the engine and extending into an enclosure or case 19 within which a set of bevel gears 21 couple shaft 18 to a stub shaft 22 which may be integral with one of the gears 21. Stub shaft 22 is supported by antifriction bearings in a cage 23 mounted in the enclosure 19. Enclosure 19 includes a forward part 25 which may be bolted to or integral with the engine case and a rear, generally cylindrical, portion 26 bolted to part 25. The stub shaft 22 bears internal splines which engage external splines 27 on a transfer shaft 29 extending from stub shaft 22 into the accessory drive housing 15.

Accessory drive housing 15 may comprise a cast case made up of a forward section 30 and a rear section 31 bolted together along a split line as illustrated. Mounting pads for devices to be driven are provided on the forward face of section 30 and the rear face of section 31. Details of such are not important to my invention. A number of pads 33 and drive shafts 32 are illustrated in FIG. 3.

Figures 3, 4:
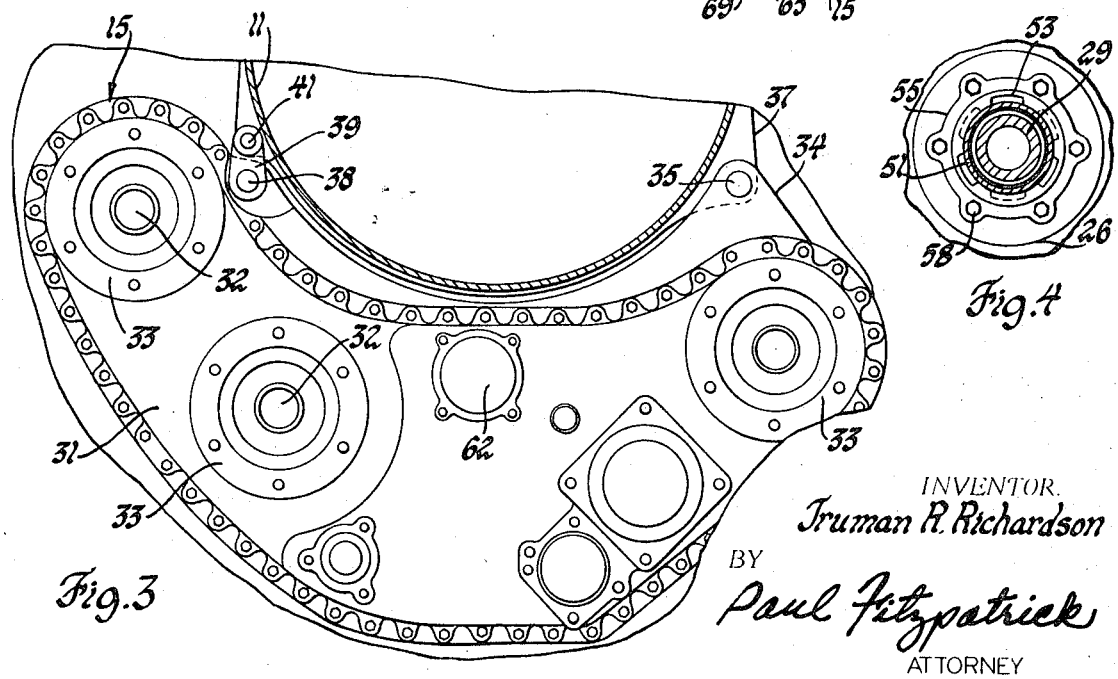
FIG. 3 is a sectional view taken on the plane indicated by the line 3—3 in FIG. 1.
FIG. 4 is a sectional view taken on the plane indicated by the line 4—4 in FIG. 2.

FIG. 3 also illustrates the suspension of the accessory drive housing 15 from the engine case 11. The housing 15 includes flanges 34 mounted on a pin 35 extending axially of the engine and mounted in a flange 37 extending from the combustion chamber case 11. The pin is slidable in flange 37. At the other side of the engine center line, a second support is provided by a pin 38 on which the housing 15 is slidably mounted, this pin being suspended from the engine by links 39 hinged on a pin 41 fixed to the combustion chamber case. The swinging link arrangement allows for relative expansion of the engine case and the accessory housing which occurs as the result of changes in temperatures of these parts in operation of the engine. The slidable movement forwardly and rearwardly of the engine of the accessory drive housing on pins 35 and 38 also provides for longitudinal expansion of the engine with respect to the drive shaft and other interconnections from the accessory housing to the engine.

The accessory drive housing mounts an input shaft 42 in suitable bearings. This shaft bears a gear 43 which drives other gearing to the accessory drives indicated by the fragment of the gear 45 illustrated in FIG. 2. Transfer shaft 29 extends into the input shaft 42 and bears external splines 46 mating with internal splines on shaft 42. The rear end of shaft 29 is threaded to receive a locating sleeve 47, the rear end of which is piloted within shaft 42 and held in place by a snap ring 49.

Transfer shaft 29 is enclosed by a shaft housing 50 extending between the portion 26 of the enclosure 19 and the accessory drive housing 15. Housing 50 comprises two parts; a long tube 51 and a collar 53 mounted on the front end of tube 51. As illustrated also in FIG. 4, there is a releasable bayonet lock connection between the parts 51 and 53 including circumferentially spaced lugs 54 on the tube 51 which may engage between interrupted flanges on the collar 53 so that these two parts are positively locked to each other in the axial direction, yet may be released. When the collar 53 is released, it may be retracted rearwardly on the tube 51. Collar 53 includes a pilot which extends into the enclosure portion 26 and the rear end of tube 51 includes a pilot which extends into the accessory gear housing. Cap screws such as 58 inserted through a bolting flange 55 on the collar and a flange 57 at the rear of the tube positively connect the ends of the shaft housing to the enclosure 19 and the accessory drive housing 15. Thus, the accessory drive housing is positively located in the direction fore and aft of the engine by the enclosure 19 and the shaft housing 50. When differential expansion of the engine and the shaft and shaft housing occur as the engine warms up in service, the accessory drive case can slide on the pins 35 and 38. Thus, the gearing is all positively tied together and the difference in thermal expansion is taken up by a slight relative movement of the accessories fore and aft of the engine.

Figure 2:
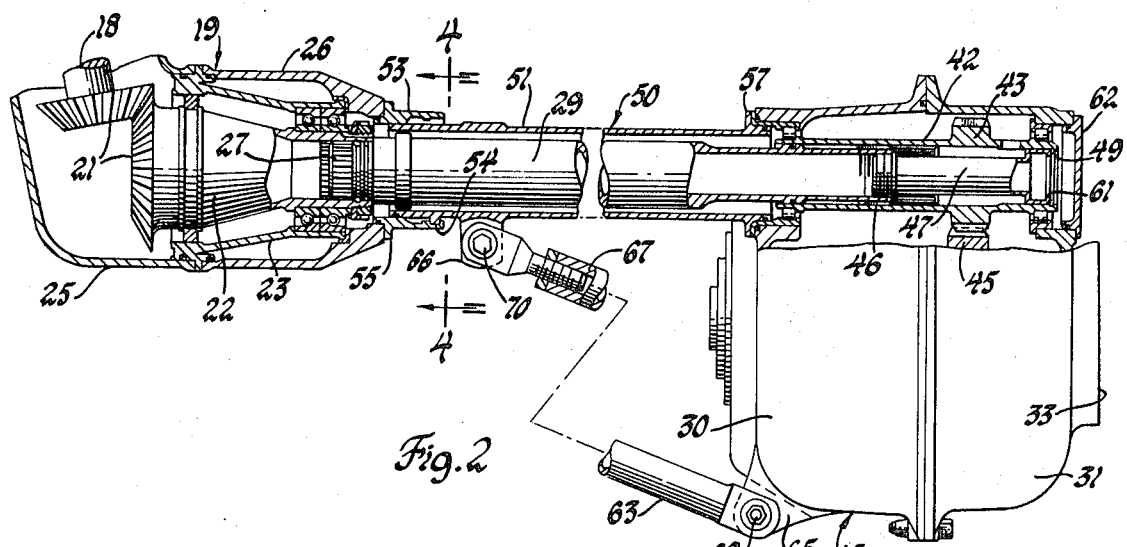
FIG. 2 is an enlarged view of the accessory installation with parts cut away and in section.

As shown in FIG. 1, at least one of the accessory devices 17 approaches close to a flange 59 on the engine which would interfere with removal of the accessories rearwardly from the engine. According to my invention, means are provided whereby, after the by-pass duct structure has been taken out of the way, the accessory drive may be disconnected and then may be removed from the engine by lowering it away from the engine. It will be noted that the front end of tube 51 terminates slightly rearwardly of the rear end of the enclosure 19. When collar 53 is released from the bayonet connection, it may be retracted rearwardly to free it from the housing. By removing the snap ring 49 and applying a suitable pulling device to the flange 61 on the interior of locating sleeve 47, the transfer shaft 29 may be drawn rearwardly so that it also is withdrawn from stub shaft 22 and clear of the enclosure portion 26. In this condition, by removing pin 38 or 41 and pin 35, the accessory drive with the accessories may be lowered from the engine. Access to the rear end of shaft 42 and sleeve 47 is provided by a removable cover 62.

Additional support for the accessory housing 15 against the moments due to the accessories which may be quite heavy, and shock loads which may increase such moments, is provided by a strut 63 (FIGS. 1 and 2) which connects to a lug 65 on housing portion 30 and to a lug 66 depending from the forward end of tube 51. Strut 63, which may be adjustable in length by a threaded connection at 67, has clevised ends fixed by bolts 69 and 70 to the lugs 65 and 66.

Suitable oil seals such as O-rings are provided between enclosure portion 26 and collar 53, between the collar and the forward end of tube 50, and between the rear end of tube 50 and accessory housing portion 30.

It will be seen that the arrangement according to my invention makes it feasible to locate the rather bulky accessories at a position where there is the maximum amount of room available between the engine and the by-pass duct and at the same time take the drive for these accessories from between the compressors which is the usual and preferred place for taking the drive. It also provides a strong support without redundant parts and provides for ready removal of the entire accessory apparatus including the drive housing or for removal of individual accessories where desired.

The detailed description of the preferred embodiment of the invention for the purpose of explaining the principles thereof is not to be considered as limiting or restricting the invention, as many modifications may be made by the exercise of skill in the art.

What is claimed is:
1. An accessory drive installation on an engine having a case and an accessory drive shaft driven by the engine comprising, in combination, an accessory drive housing mounted on the engine case spaced from the drive shaft, a transfer shaft extending generally parallel to the case into the drive housing, means drivingly coupling the transfer shaft to the drive shaft, a removable shaft housing enclosing the transfer shaft connected to the engine case and the drive housing so as to locate the housing axially of the transfer shaft, and means supporting the housing on the case providing for relative movement of the housing and case axially of the transfer shaft.
2. An installation as recited in claim 1 in which the engine includes a fan duct surrounding the engine and the accessory drive housing is mounted between the engine case and the fan duct.
3. An installation as recited in claim 1 including transfer gearing coupling the drive shaft to the transfer shaft and an enclosure for the transfer gearing on the engine, and in which the shaft housing is fixed to the said enclosure.
4. An installation as recited in claim 1 including transfer gearing coupling the drive shaft to the transfer shaft, an enclosure for the transfer gearing, the shaft housing being connected to the enclosure and the transfer shaft extending into the enclosure and being slidably connected to the transfer gearing, and means providing for retraction of the transfer shaft and the shaft housing from the enclosure to free the drive shaft and shaft housing from the enclosure for removal of the drive housing from the engine in the direction generally perpendicular to the transfer shaft and away from the case.
5. An installation as recited in claim 1 including means for retracting the transfer shaft from the means drivingly coupling it to the drive shaft.
6. An accessory drive installation on an engine having a case and an accessory drive shaft driven by the engine comprising, in combination, an accessory drive housing mounted on the case spaced from the drive shaft, a transfer shaft coupled to the drive shaft and extending generally parallel to the case into the drive housing, a removable shaft housing enclosing the transfer shaft, transfer gearing coupling the drive shaft to the transfer shaft, an enclosure for the transfer gearing on the engine case, the shaft housing being connected to the enclosure and the transfer shaft extending into the enclosure and being slidably connected to the transfer gearing, and means providing for retraction of the transfer shaft and the shaft housing from the enclosure to free the drive shaft and shaft housing from the enclosure for removal of the drive housing from the engine in the direction generally perpendicular to the transfer shaft and away from the case.
7. An installation as recited in claim 6 in which the engine includes a fan duct surrounding the engine and the accessory drive housing is mounted between the engine case and the fan duct.
8. An installation as recited in claim 7 in which the engine case bulges at the side of the accessory drive housing opposite to the transfer shaft.

References Cited

UNITED STATES PATENTS

| | | | |
|---|---|---|---|
| 3,269,118 | 8/1966 | Benedict et al. | 60—39.31 |
| 3,332,242 | 7/1967 | Johnson | 60—39.31 X |

LEONARD H. GERIN, Primary Examiner

U.S. Cl. X.R.

60—39.31